UNITED STATES PATENT OFFICE.

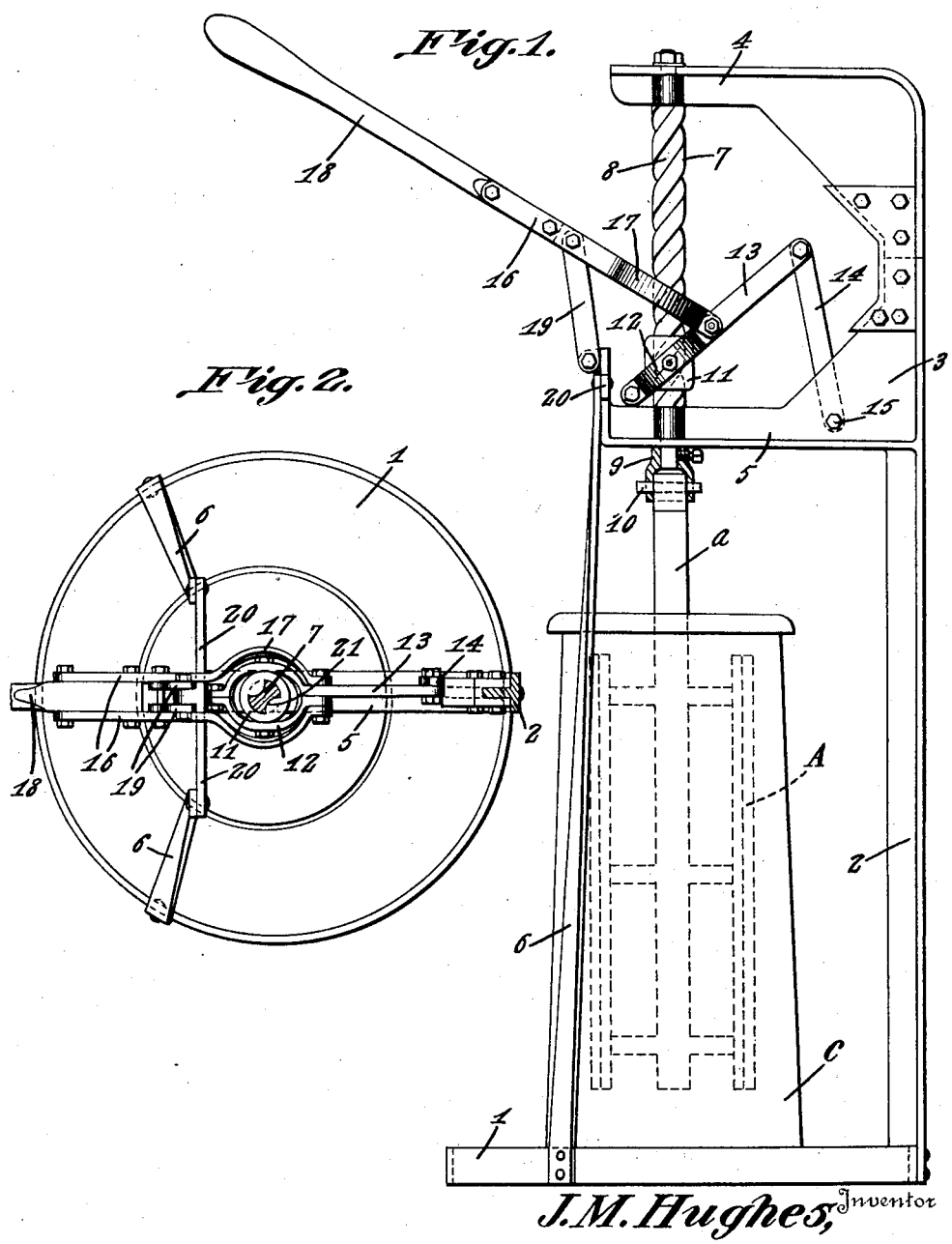

JOHN M. HUGHES, OF ATLANTA, GEORGIA.

POWER MECHANISM.

1,395,573. Specification of Letters Patent. Patented Nov. 1, 1921.

Application filed July 23, 1921. Serial No. 487,139.

*To all whom it may concern:*

Be it known that I, JOHN M. HUGHES, a citizen of the United States, residing at Atlanta, in the county of Fulton and State of Georgia, have invented a new and useful Power Mechanism, of which the following is a specification.

This invention relates to power mechanism for churns, ice cream freezers, washing machines, and the like utilizing agitators adapted to be rotated back and forth within containers.

It is an object of the invention to provide simple and efficient means for converting oscillatory motion into rotary motion, the means employed for this purpose being simple and compact and easily operated.

Another object is to provide power mechanism using an actuating lever so mounted and connected that the motion thereof necessary to produce the desired rotation of the agitator, is reduced to the minimum.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown. In said drawings—

Figure 1 is a side elevation of the power mechanism combined with a churn, a portion being shown in section.

Fig. 2 is a plan view, the screw being shown in section.

Referring to the figures by characters of reference 1 designates a base on which is mounted a standard 2 supporting a head 3. This head is preferably formed with upper and lower arms 4 and 5 and downwardly diverging braces 6 may be provided for connecting the head to the base 1. The churn indicated at C may be mounted on the base and is provided with an agitator A preferably of that type adapted, when rotated in a body of fluid, to create a partial vacuum so as to cause air to rush into the body of the fluid and thus expedite the completion of the churning operation.

The power mechanism includes a spindle 7 having a spiral groove 8 forming a screw, this spindle being journaled in the upper and lower arms 4 and 5 and having a coupling 9 detachably secured to its lower end and suitably fastened to the shank *a* of the agitator, as by means of a pin 10 extending diametrically through the coupling and through the shank.

A nut 11 is slidably mounted on the spindle 7 and is pivotally connected to and mounted within a split ring 12 constituting one arm of a lever 13. The other arm of this lever forms one link of a toggle and is pivotally connected to a supporting link 14 attached to the arm 5 by a pivot bolt 15 or in any other suitable manner. An operating lever 16 straddles the spindle 7 and is pivotally connected to the lever 13 between the ends thereof, this lever being formed of spaced oppositely arranged strips bowed as shown at 17 so as to permit the split ring 12 to pass between them. A handle 18 is connected to the lever 16 and a link 19 supports said lever from the front portion of the arm 5. It will be noted that this arm has oppositely extending tongues 20 to which the braces 6 are attached.

That portion of lever 17 between the link 19 and the lever 13 forms the other link of the toggle. Thus when the handle 18 is operated in a vertical plane this toggle will act to raise and lower the nut 11. The nut has portions 21 projecting into the spiral grooves 8 so that reciprocation of the nut will result in back and forth rotation of the spindle 7 and in corresponding movement of the agitator A. By utilizing the toggle mechanism and having the nut 11 connected to an extension upon one of the links of the toggle the power required for actuating the parts is greatly reduced and the movement of lever 16 is much less than would be required should this lever be connected to the nut in any other manner than that disclosed.

Obviously lever 16 can be operated by a motor instead of by hand and while the mechanism has been shown applied to a churn it is to be understood that it can also be used for operating other devices.

What is claimed is:—

1. Power mechanism of the class described including a supporting structure, a spindle mounted for rotation thereon and having a spiral groove, a nonrotatable nut slidable on the spindle and projecting into the groove, connected levers forming a toggle, link supports for the respective levers, means carried by one of the levers and projecting beyond the toggle for engaging and actuating the nut, and means for oscillating the toggle to shift the nut.

2. In power mechanism the combination with a supporting structure, of a screw mounted for rotation, means for connecting the screw to an agitator, pivotally connected levers forming a toggle, means for applying power to one of the levers, link supports for the respective levers at the ends of the toggle formed thereby, one of said levers projecting beyond its point of connection with the other lever, a nut carried by said projecting portion and slidably engaging the screw, said projecting portion of the lever being mounted to swing through the adjoining portion of the other lever.

3. Power mechanism of the class described including a screw mounted for rotation, means for coupling the screw to an agitator, a nut slidable on the screw for rotating the same, connected levers forming a toggle, links pivotally attached to the levers at the outer ends of the toggle to support the levers, one of said levers projecting past its point of connection with the other lever, and means for pivotally connecting said projecting portion to the nut.

In testimony that I claim the foregoing as my own, I have hereto affixed my signature.

JOHN M. HUGHES.